United States Patent [19]
Duret et al.

[11] 3,944,468
[45] Mar. 16, 1976

[54] FUEL PIN CLUSTER FOR A HIGH-POWER REACTOR

[75] Inventors: Georges Duret, Manosque; Georges Place; Jean Rousseau, both of Aix-en-Provence, all of France

[73] Assignee: Commissariat a l'Energie Atomique, Paris, France

[22] Filed: Feb. 13, 1974

[21] Appl. No.: 442,244

[30] Foreign Application Priority Data
Feb. 19, 1973   France .............................. 73.05828

[52] U.S. Cl. ..................................... 176/81; 176/78
[51] Int. Cl.² ........................................... G21C 3/12
[58] Field of Search ................................. 176/81, 78

[56] References Cited
UNITED STATES PATENTS

| | | | |
|---|---|---|---|
| 3,150,057 | 9/1964 | Monson et al. | 176/81 |
| 3,170,848 | 2/1965 | Saunders | 176/81 |
| 3,573,168 | 3/1971 | Campbell | 176/81 |
| 3,607,642 | 9/1971 | Murdock et al. | 176/81 |
| 3,738,912 | 6/1973 | Rachor et al. | 176/81 |

FOREIGN PATENTS OR APPLICATIONS

| | | | |
|---|---|---|---|
| 2,059,139 | 5/1971 | France | 176/81 |
| 1,238,148 | 7/1971 | United Kingdom | 176/81 |

*Primary Examiner*—Harvey E. Behrend
*Attorney, Agent, or Firm*—Cameron, Kerkam, Sutton, Stowell & Stowell

[57] ABSTRACT

Each fuel pin of the cluster is fitted with a spacer element wound in a coarse-pitch helix on the external surface of the fuel can and attached to end-caps of the can. The spacer element consists of a deformable tube having a constant initial cross-section, the tube being fitted internally with a reinforcement wire which is mounted within the tube with provision for a clearance space and extends over the entire length of the tube.

1 Claim, 2 Drawing Figures

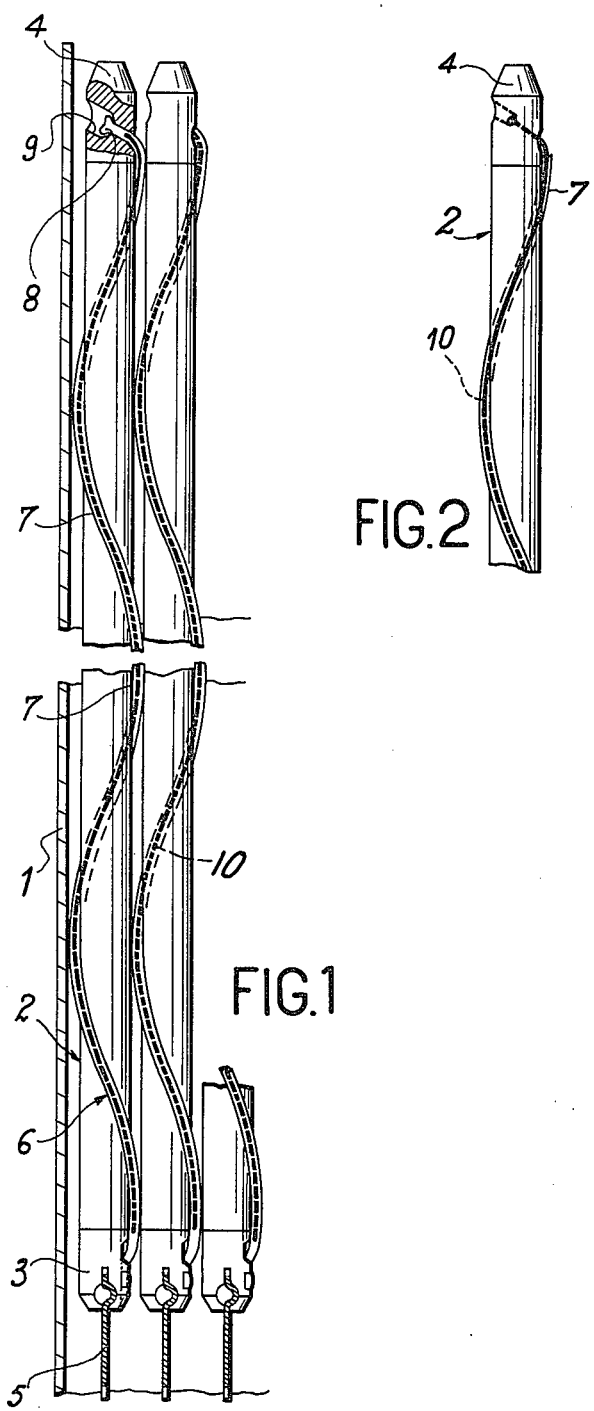

FUEL PIN CLUSTER FOR A HIGH-POWER REACTOR

This invention relates to a cluster of fuel pins for a nuclear reactor of the high-power type and especially for a fast reactor in which the core is cooled by a circulation of liquid metal usually consisting of sodium, the reactor core being constituted by a juxtaposed array of fuel assemblies each formed by a casing or sleeve of polygonal cross-section which is open at the top and provided with a bottom end-fitting for positioning the fuel assembly in a support grid or so-called diagrid while maintaining said assembly in a vertical position. Each sleeve contains a cluster of canned fuel pins of substantial length and each fuel pin in turn contains the fissile and fertile materials which are necessary for the operation of the reactor. The pins have parallel axes and are disposed on a lattice which is usually uniform and hexagonal. The pins in each cluster are maintained in relatively spaced relation by means of a spacer wire of constant cross-section which is wound in a helix having a coarse pitch around the external surface of the can of each fuel pin and is applied against the adjacent pins.

In known design solutions of this type, channels of small cross-section for the circulation of the coolant sodium are delimited on the one hand between the fuel pins of the cluster and on the other hand between said pins and the sleeve wall of the fuel assembly. In point of fact, a number of problems arise especially when the fuel pins are intended to be employed at very high burnup rates of the order of 100,000 MWDt/t caused by the appearance of appreciable swelling of said fuel pins and in particular of the canning material which usually consists of steel. This gives rise to a reduction of the useful cross-sectional area provided in the channel for sodium flow between the fuel pins and at the same time to flattening of the pins by compression. The resultant faulty cooling or abnormal performance of the fuel within ovalized cans may lead to can failures which are in turn liable to cause more serious accident conditions.

The aim of this invention is to provide a fuel-pin cluster which affords better resistance to the effects of swelling of each fuel can than is the case with fuel clusters of types at present known while ensuring suitable spacing between each fuel pin and the surrounding pins in each fuel cluster.

To this end, the fuel cluster under consideration in which each fuel pin is fitted with a spacer element wound in a coarse-pitch helix on the external surface of the fuel-pin can and rigidly fixed to end-caps of said can is distinguished by the fact that said spacer element is constituted by a deformable tube having a constant initial cross-section, said tube being fitted internally with a reinforcement wire which is mounted with a space within the tube and extends over the entire length of this latter.

As an advantageous feature, the thickness of the deformable tube is so determined that, in the event of swelling of the fuel pin, said tube is subjected to continuous plastic deformation before the fuel-pin can in turn undergoes deformation.

Depending on requirements, the connection between the deformable tube and the end-caps is formed by welding, crimping or insertion of a die-stamped or fusion-cast head by means of the tube itself or by means of a portion of the internal reinforcement wire which projects to a short distance beyond the ends of the tube, or alternatively by means of the assembly formed by the tube and its internal reinforcement.

Further properties of a fuel-pin cluster as constructed in accordance with the invention will become apparent from the following description of one exemplified embodiment which is given by way of indication without any limitation being implied, reference being made to the accompanying drawings, wherein:

FIG. 1 is a part-sectional view in elevation showing a nuclear reactor fuel assembly comprising a fuel cluster which is provided with the improvement under consideration;

FIG. 2 is a detail view of an alternative form of construction.

In FIG. 1, the reference numeral 1 designates the outer casing or sleeve of a fuel assembly for a fast reactor cooled by liquid sodium; said sleeve encloses a cluster of parallel fuel pins 2 designed in the form of cylinders of substantial length, the cans of which consist of a jacket fabricated from type-316 stainless steel and having an external diameter of 8.65 mm, said jacket being closed by end-caps 4 and 5 of "316" stainless steel. The pins 2 of the cluster 1 are disposed on a uniform hexagonal lattice and inserted by means of their bottom end-caps 3 on vertical rails 5.

In accordance with the invention, the spacing between the pins 2 of the fuel cluster within the sleeve 1 is achieved by means of a spacer element 6 which is wound in a helix having a coarse pitch (for example 200 mm) on the external surface of the can of each pin 2, said spacer element being constituted by a deformable tube 7 which extends over the entire length of each pin. Said tube 7 which is also of type-316 stainless steel has an external diameter of 1.4 mm, for example, and is rigidly fixed to the fuel pin at the lower end and at the level of the endcap 3 either by crimping or by welding. Said tube 7 is fitted at the upper end with a die-stamped or fusion-cast head 8 as provided in particular by the arrangements described in French Pat. No. 69.20597 of June 19, 1969 in the name of Commissariat a l'Energie Atomique. Moreover and in accordance with a further property of the invention, the deformable tube 7 which is helically wound on the external surface of the fuel pin 2 is fitted with an internal reinforcement wire 10 of type-316 stainless steel. Said wire can advantageously project to a slight extent from the ends of the tube so as to facilitate the connection between the spacer element and the end-caps. This connection can be formed simultaneously with the wire and the tube or alternatively with the wire alone as illustrated in the detail view of FIG. 2.

In the example considered, the tube 7 has an internal diameter of 1.22 mm whilst the internal reinforcement wire 10 which extends over the entire length of the tube has a diameter of 0.76 mm such as to delimit within the interior of said tube a space which is sufficient to permit limited deformation of the tube at the time of swelling of the fuel pins during operation.

The internal reinforcement wire which is mounted within the deformable tube prevents complete flattening of the tube in all cases, thus maintaining a sufficient spacing between the fuel pins. If no provision were made for the reinforcement wire and maximum flattening of the tube were to take place, there would in fact be a potential danger of crack formation within said tube as well as the appearance of hot spots on the fuel cans. On the contrary, by virtue of the arrangements proposed, deformation of the tubes remains limited to a value which remains acceptable for cooling of the fuel pins. The space existing between the internal reinforcement and the tube can readily be calculated as a function of the design parameters of the fuel assembly and operating conditions within the reactor core while taking into account in particular the geometry of the components of said assembly and the character of the materials employed.

A further advantage of the internal reinforcement wire lies in the fact that it maintains the spacer tube in position on the external surface of the fuel can even in the event of accidental crack formation of said tube in the central region of this latter between the points of attachment of the tube ends to the fuel can end caps. The connection of the tube or of its reinforcement wire does not give rise to any further difficulty as compared with the conventional solution in which the spacer element is constituted only by a wire of constant diameter. The assembly formed by the tube and the reinforcement wire serves in addition to facilitate positioning of the spacer element without any attendant danger of causing damage to the tube itself since tension is applied solely to the wire during the helical winding operation. Finally, in the case of large-scale manufacture, it is possible either to employ a wire which has already been sheathed or on the contrary to insert the wire in the outer tube at the moment of winding onto the fuel pins.

The spacer element which is formed in accordance with the invention permits a certain degree of bowing of the fuel assemblies without introducing high values of stress, general bending of the fuel-pin cluster being permitted by partial flattening of the hollow tubes. This property makes it possible to solve a problem presented by power reactors having burnups of the order of 100,000 MWDt/t, in which the fuel assemblies comprise a high number of pins. In point of fact, interaction takes place between the pins of the cluster and the outer sleeve of each fuel assembly by reason of the fact that the cans of the fuel pins have a swelling rate which is higher than that of said sleeve. By virtue of the limited flattening of the spacer tubes, the observed difference in swelling prevents the occurrence of fuel-can failures.

In all cases and as stated in the foregoing, the spacer tube must be subjected to continuous plastic deformation before the fuel cans are deformed in turn. The ratio of diameter to thickness of each spacer tube is advantageously chosen so as to be at least equal to the same ratio as measured in the case of each fuel can.

Finally, the fuel cluster in accordance with the present invention can be associated within a fuel assembly with arrangements which are intended to reduce the cross-sectional area of the peripheral sub-channels by providing the outer sleeve or casing of the fuel assembly either with internal longitudinal projecting portions or with recessed portions, these arrangements being known per se.

As has become apparent from the foregoing, the invention is clearly not limited to the exemplified embodiment which has been more especially described in the foregoing with reference to the accompanying drawings but extends on the contrary to all alternative forms

We claim:

1. A fuel-pin cluster for a nuclear reactor comprising a plurality of fuel-pins, a can for each of said pins, end-caps for each of said cans, a spacer element for each of said fuel-pins wound in coarse pitch helix on the external surface of the fuel-pin can and rigidly fixed to the end-caps of said can, said spacer element including a tube terminating short of said end caps having a constant initial cross section and having a ratio of diameter to thickness at least equal to the ratio of diameter to thickness of the fuel-pin can and a reinforcement wire mounted with clearance within said tube and extending over the entire length of said tube and means for rigidly securing the internal reinforcement wire to the end-caps.

* * * * *